RADIO-PHONOGRAPH CIRCUITS

Filed March 3, 1958 2 Sheets-Sheet 1

INVENTOR.
HAROLD B. STOTT
BY
W. H. Sprague
ATTORNEY

Aug. 23, 1960 H. B. STOTT 2,950,356

RADIO-PHONOGRAPH CIRCUITS

Filed March 3, 1958 2 Sheets-Sheet 2

INVENTOR.
HAROLD B. STOTT
BY
W. H. Sprague
ATTORNEY

United States Patent Office 2,950,356

Patented Aug. 23, 1960

2,950,356

RADIO-PHONOGRAPH CIRCUITS

Harold B. Stott, Glenolden, Pa., assignor to Radio Corporation of America, a corporation of Delaware Filed Mar. 3, 1958, Ser. No. 718,518

7 Claims. (Cl. 179—100.11)

This invention relates to apparatus and circuits for adapting a radio receiver for the amplification and reproduction of signals from phonograph pickups and the like, and in particular to apparatus and circuits of this type for use with transistor radio receivers.

Most commercial radio receivers include a phonograph jack which may be used to connect a phonograph pickup to one or more of the amplifying stages of the receiver. A switch is also usually provided in the receiver to remove the biasing or energizing voltages from the receiver stages which are not used to amplify the phonograph signals. By removing the energizing potentials from these stages, they are unable to amplify received radio frequency signals, which, if amplified, would interfere with the reproduction of the phonograph signals. Amplification of radio frequency signals may also be prevented by tuning the receiver to a frequency which is not being transmitted. The cost of the receiver is increased by the addition of an on-off switch, and the tuning of the receiver to a quiet spot on the radio frequency band is inconvenient and often not productive of satisfactory performance.

It is, accordingly, an object of this invention to provide improved means for adapting a radio receiver for the amplification of signals from phonograph pickups and the like.

It is another object of this invention to provide improved apparatus and circuitry for a signal receiver which permits the amplification of signals from phonograph pickups and the like, without the amplification and reproduction of radio frequency signals.

A radio receiver embodying the invention includes switching means responsive to the insertion of a plug from a phonograph pickup into a phonograph jack of the receiver. The switching means connects the phonograph pickup to a signal translating stage of the receiver, which, for radio operation, provides an AGC signal for reducing the gain of one or more of the receiver amplifying stages in response to received signal of predetermined amplitude. This stage thus serves as a preamplifier for the phonograph signal. In addition, this stage provides, through the normal AGC circuitry of the receiver, a signal for reducing the gain of one or more of the receiver's amplifying stages, thus preventing the amplification of radio frequency signals during phonograph operation. This type operation is achieved in response to the insertion of an ordinary phonograph plug into a phonograph jack especially adapted to connect the phonograph pickup with a translating and AGC stage of the receiver and to simultaneously change the bias on this stage.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2:
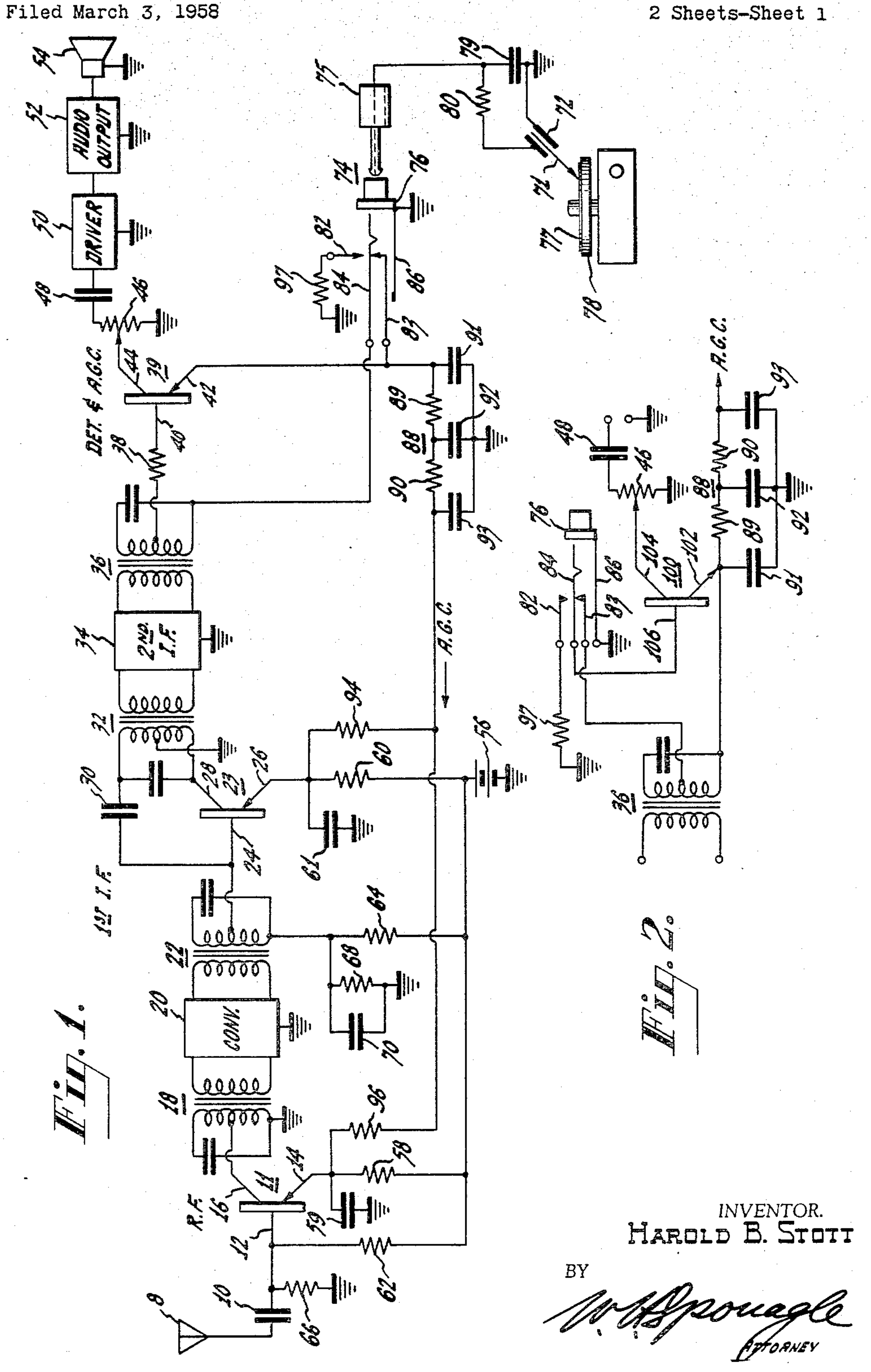
Figure 1 is a schematic circuit diagram, partially in block diagram form, of a radio receiver and phonograph pickup embodying the invention.
Figure 2 is a schematic circuit diagram of a transistor signal translating and AGC stage and phongraph jack embodying the invention.

Referring now to the drawings, wherein like parts are indicated by like reference numerals throughout the figures, and referring in particular to Figure 1, a signal receiving system embodying the invention includes an antenna 8, which is coupled through a coupling capacitor 10 to the base electrode 12 of a transistor 11. The transistor 11, which may be considered to be of the P-N-P junction type, also includes an emitter 14 and a collector 16, and is connected to operate as a common emitter amplifier for amplifying a radio frequency signal received by the antenna 8. The amplified radio frequency signal is coupled thorugh a transformer 18 to a frequency converter stage 20 which may be of conventional form. The converter stage 20 may include separate oscillator and mixer stages or a single stage connected to generate the oscillator signal and to mix this oscillator signal with the received radio frequency signal to provide an intermediate frequency (I.F.) signal. The I.F. signal is coupled through a transformer 22 to the base electrode 24 of a first I.F. transistor amplifier 23. The transistor 23, which may also be considered to be of the P-N-P junction type includes an addition to the base 24, an emitter 26 and a collector 28. A neutralizing capacitor 30 is connected between the collector and base of this transistor. After amplification by the first I.F. transistor 23, the I.F. signal is coupled through a transformer 32 to a second I.F. amplifier stage 34. The second I.F. stage 34 may be similar to the first I.F. amplifier stage. The amplified I.F. signal is then coupled through a transformer 36 and a resistor 38 to the base electrode 40 of a transistor 39.

The transistor 39, which is connected to separate the modulation components from the received signal to provide an audio frequency signal and to provide an AGC signal for controlling the gain of one or more amplifying stages of the receiver such as the transistors 11 and 23, may also be considered to be of the P-N-P junction type. The transistor 39 includes, in addition to the base electrode 40, an emitter electrode 42 and a collector electrode 44. The detected audio frequency signal is coupled through a volume control resistor 46 and a coupling capacitor 48 to a conventional driver stage 50. After amplification by the driver stage 50, the audio frequency signal is applied to a conventional audio output stage 52 of the receiver which is connected to a loudspeaker 54.

To provide biasing voltages for the various receiver stages, a battery 56 is provided, the negative terminal of which is connected to a point of fixed reference potential such as ground. The positive terminal of the battery 56 is connected through emitter stabilizing resistors 58 and 60 to the emitters 14 and 26 of the transistors 11 and 23, respectively. The emitter stabilizing resistors are by-passed for signal frequencies by respective by-pass capacitors 59 and 61. The positive terminal of the battery 56 is also connected through respective resistors 62 and 64 to the base electrodes 12 and 24 of the transistors 11 and 23. A resistor 66 is connected from the base 12 of the transistor 11 to ground and forms, in combination with the resistor 62, a voltage divider. The resistance values of the resistors 62 and 66 are selected so that the voltage on the emitter 14 of the transistor 11 is more positive than the voltage on the base 12 of the transistor 11, thus providing a forward bias voltage for the transistor 11. Similarly, a resistor 68 is connected in circuit between the base 24 of the resistor 23 and ground, and forms, in combination with the resistor 64, a voltage divider for maintaining the voltage at the base 24 of the transistor 23 at some potential which is less positive than the potential at the emitter 26 of this transistor. The resistor 68 is bypassed for signal frequencies by a by-pass capacitor 70. While not shown, it is to be understood that biasing circuits, which may be similar to those described for the R.F. transistor 11 and first I.F. transistor 23, would normally be provided for the converter, second I.F., driver, and audio output stages of the receiver. As thus far described, the receiver of Figure 1 will be recognized as being of the conventional superheterodyne type.

To amplify signals from a signal transducer such as a phonograph pickup with the receiver circuitry of Figure 1 a phonograph pickup device 72, which may be of the conventional ceramic type, is connected by means of a connector 74 to the detector and AGC transistor 39. These connections are such that, in accordance with the invention, the detector and AGC transistor 39 serves as a preamplifier for the phonograph signal and is operative through the receiver AGC circuitry to reduce the gain of the R.F. transistor 11 and first I.F. transistor 23 for phonograph operation, thus permitting the amplification of signals from the phonograph pickup without the amplification of received radio frequency signals. The stylus 71 of the phonograph pickup 72 responds to the groove modulations of a phonograph record 77 on a phonograph turntable 78 to provide an electrical signal. This signal is coupled from one electrode of the pickup through a resistor 80 to the plug portion 75 of the phonograph connector 74. The other electrode of the pickup 72 is connected to ground and a compensating capacitor 79 is connected from the terminal of the resistor 80 nearest the plug 75 to ground.

The connector 74 is illustrated schematically by a pair of fixed electrical contacts 82 and 83, a movable contact 84, and a ground contact 86. In the position shown, that is with the plug 75 removed from the jack 76, the movable contact 84 is in contact with the fixed contact 83. Thus the emitter 42 of the transistor 39 is connected through the fixed contact 83, the movable contact 84, the lower half of the secondary winding of the transformer 36, and the resistor 38 to the base 40 of the transistor 39. It is to be noted that the emitter 42 of the detector and AGC transistor 39 is connected through an AGC filter 88 and a resistor 94 to the emitter 26 of the first I.F. transistor 23 and through the filter 88 and a resistor 96 to the emitter 14 of the radio frequency transistor 11. The filter network 88 comprises a pair of serially connected resistors 89 and 90 and capacitors 91, 92 and 93 which are respectively connected between the emitter 42 of the transistor 39 and ground, the junction of the resistors 89 and 90 to ground, and the junction of the resistors 90 and 94 to ground.

Since the emitters 14 and 26 of the transistors 11 and 23 are also connected to the positive terminal of the battery 56 through the emitter stabilizing resistors 58 and 60, the connection of the movable contact 84 with the fixed contact 83 provides a direct current return path for the emitter 42 and base 40 electrodes of the detector and AGC transistor 39 for radio receiver operation. The applied intermediate frequency signal is rectified by the base-emitter diode of the detector transistor 39, thus removing the modulation components from the received signal to provide an audio frequency signal which is applied, as noted above, through the volume control resistor 46 and the coupling capacitor 48 to the driver stage 50. In the absence of a received radio frequency signal, there is no emitter current flowing in the detector transistor 39. If the strength of the received (and thus the I.F.) signal is increased, the emitter current of the detector and AGC transistor 39 increases. Since the emitter 42 of the transistor 39 is connected through the AGC circuitry described to the emitters 14 and 36 of the transistors 11 and 23, an increase in the emitter current of the transistor 39 reduces the forward bias on the transistors 11 and 23, thus reducing the gain of these transistors. This provides AGC action for the receiver during radio receiver operation.

The insertion of the plug 75 into the jack 76 moves the movable contact 84 into electrical contact with the fixed contact 82. The fixed contact 82 is connected to ground through a relatively large resistor 97. The resistor 97 is thus connected between the base 40 and ground and the connection between the base 40 and the emitter 42 of the transistor 39 is opened. The forward bias voltage between the emitter 42 and base 40 of the transistor 39 is determined by the difference in potential between the base and emitter electrodes. The potential between the base and ground is determined by the direct current voltage drop across the resistor 97. The potential between the emitter and the positive terminal of the battery is determined by the direct current voltage drop across the AGC filter resistors 89 and 90 and the parallel combination of the resistors 94, 60, 96 and 58. The resistance values of these resistors are so chosen that the base voltage is approximately 0.15 volt negative. This increases the forward bias for the transistor 39 for phonograph operation and permits emitter current to flow. By increasing the forward bias on the transistor 39 higher gain operation for the preamplification of the phonograph signals is provided. In addition, the emitter current which flows due to this forward bias is used to reduce the gain of the R.F. and first I.F. transistors during phonograph operation.

The phonograph signal is coupled through the movable contact 84, the lower portion of the secondary winding of the transformer 36, and the resistor 38 to the base 40 of the transistor 39. The transistor 39, which is a common emitter amplifier, thus serves as a preamplifier for phonograph operation. The amplified phonograph signal is then applied through the volume control resistor 46 and the coupling capacitor 48 to the driver stage 50 and thence to the audio output stage 52 and loudspeaker 54. By using a detector and AGC transistor 39 as a preamplifier for the phonograph signals, sufficient power gain is provided in the circuitry to overcome any impedance mismatching between the phonograph and the transistor. Thus a low or high impedance pickup may be used. If a low impedance pickup with low direct current resistance is used, however, it should be coupled to the transistor 38 through a blocking capacitor to prevent the possible short circuiting of the resistor 97.

As was mentioned hereinbefore, the forward base-emitter bias of the transistor 39 is increased for phonograph operation. This permits emitter current to flow in the transistor 39. This emitter current, in turn, reduces the gain of the R.F. transistor 11 and first I.F. transistor 23 through the AGC circuitry of the receiver by reducing the forward bias for these transistors. Thus, for phonograph operation, the amplification of received radio frequency signals is prevented. This is accomplished, moreover, without the need of separate switching circuits for removal of the biasing voltage from these stages, or without the need of tuning to a quiet portion of the radio frequency band.

While it will be understood that the circuit specifications may vary according to the design for any particular application, the following circuit specifications are included for the circuit of Figure 1, by way of example.

| | |
|---|---|
| Resistors 38; 58; 60; 62; 64; 66; 68; 89; 90 and 97 | 1,000; 1,000; 4,700; 12,000; 3,900; 47,000; 10,000; 220; 220 and 150,000 ohms, respectively. |
| Capacitors 59; 61; 70; 91; 92 and 93 | .1; .1; .1; 25; 25 and 25 microfarads, respectively. |
| Battery 56 | 13.5 volts. |

The invention is not restricted to the use of transistors of any particular conductivity type. In Figure 2, for example, an N-P-N transistor 100 is connected to provide signal detection and an AGC signal for radio receiver operation, and to provide preamplification of a phonograph signal in response to the insertion of a plug in the jack 76. The transistor 100 includes an emitter 102, a collector 104, and a base 106. The collector and emitter circuits of the transistor 100 are the same as those for the detector and AGC transistor 39 of Figure 1. Thus an audio frequency output signal from the collector 104 flows through a volume control resistor 46 and is coupled through a coupling capacitor 48 to the receiver output driver stage. An AGC signal is derived from the emitter 102 and coupled through an AGC filter network 88 to selected amplifier stages (not shown) of a signal receiver. The contacts of the phonograph jack 76 are so connected with the transistor 100 in Figure 2 that for phonograph operation, that is with the movable contact 84 in contact with the fixed contact 82, the phonograph signal is applied directly to the base 106 rather than through the secondary winding of the I.F. transformer 36 and the resistor 38 as in Figure 1. The connection to the tap on the secondary winding of the transformer 36 is open circuited for phonograph operation. For radio receiver operation the connections for the circuit of Figure 2, aside from the elimination of the resistor 38, are the same as for the circuit of Figure 1.

Figure 3:
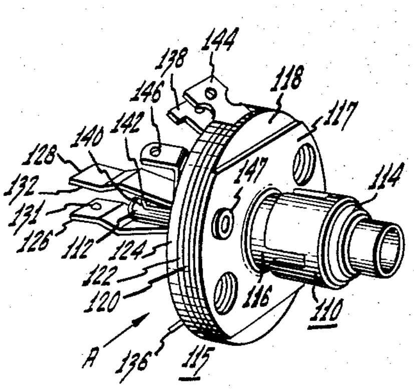
Figure 3 is a view in perspective of a radio-phongraph connector suitable for use in the circuits of Figures 1 and 2 and embodying the invention.
Figure 4:
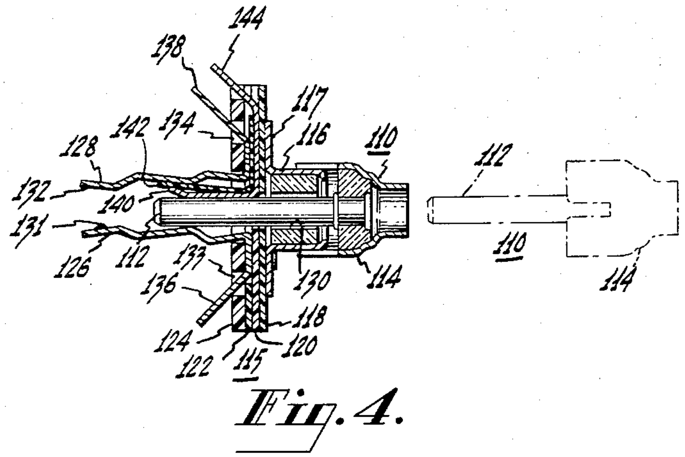
Figure 4 is a sectional view of the connector of Figure 3.

The mechanical details of a connector suitable for use in the circuits of Figures 1 and 2 is illustrated in Figures 3 and 4, reference to which is now jointly made. The connector illustrated in Figures 3 and 4 may be used in place of the connector 74 which is illustrated schematically in Figures 1 and 2. The connector includes a plug 110, comprising a conductive prong 112 and a conductive cap member 114 which is adapted to engage a nipple 116, which is an integral part of or may be attached to a conductive plate 117 of the jack 115. The jack 115 portion of the connector further includes four insulating plates 118, 120, 122 and 124 of equal diameter, which are attached together in stacked relation. The insulating plates 118, 120, 122 and 124 serve to separate the various conductive members of the jack. The jack 115 portion of the connector further includes a pair of substantially identical and U-shaped conductive members or strips 126 and 128. One leg of each of the members 126 and 128 extends in an axial direction from either side of an opening 130 in the jack. The members 126 and 128 are bent so that they are in contact with each other at their ends 131 and 132 when the plug 110 is not inserted in the jack 115. This provides an electrical connection, for example, between the base and emitter electrodes of the transistor 39 in Figure 1 or the transistor 100 in Figure 2 for radio receiver operation. The contact between the members 126 and 128 is illustrated schematically in Figures 1 and 2 by the electrical connection of the movable contact 84 with the fixed contact 83. The members 126 and 128 are bent under the insulating plate 124 and through respective openings 133 and 134 therein. This forms a pair of legs 136 and 138 to which an electrical solder connection from the base and emitter electrodes of the transistor 39 of Figure 1 or the transistor 100 of Figure 2 can be made.

A third conductive member 140 also extends through opening 130 of the jack in a direction substantially parallel to the members 126 and 128. The conductive member 140 is separated from the conductive member 128 by an insulating strip 142. The conductive member 140 is bent and occupies the space between the insulating plates 118 and 120. The conductive member 140 terminates at its other end in a terminal 144, to which a solder connection may be made from the resistor 97 in Figures 1 and 2. A solder connection is also made to the terminal 144 from the low voltage terminal of the secondary winding of the transformer 36 in Figure 1 and the base electrode 106 of the transistor 100 in Figure 2.

To provide a ground connection for the connector a terminal 146 (Figure 3) is provided. The terminal 146, which would normally be connected to the receiver chassis, is electrically connected through an eyelet 147 to the conductive plate 117. The eyelet 147 thus serves to hold the complete jack assembly including the insulating plates 118, 120, 122 and 124 together and provides a conductive connection to ground for the plate 117 and the plug 110 when it is inserted in the jack opening 130.

As was mentioned hereinbefore, the plug 110 is removed from the jack 115 for normal radio receiver operation. Thus, if the connector of Figures 3 and 4 were used in the receiver of Figure 1, removal of the plug 110 from the jack 115 would provide a direct-current return path for the base and emitter electrodes of the detector and AGC transistor 39. This connection would be completed through the conductive members 126 and 128 of the connector of Figures 3 and 4. The receiver of Figure 1 would then operate in accordance with well known superheterodyne principles. For radio receiver operation, the transistor 39 is operative to detect the I.F. signal and to provide an AGC signal for controlling the gain of the R.F. transistor 11 and first I.F. transistor 23.

Upon insertion of the plug 110 in the jack 115, the contact between the members 126 and 128 is interrupted, thus interrupting the connection between the base and emitter electrodes of the transistor 39 of Figure 1. A conductive path is provided, at the same time, from the phonograph pickup, through the plug 110 and conductive member 140 (which is in contact with the prong 112 of the plug 110), the lower half of the secondary winding of the transformer 36, and the resistor 38 to the base 40 of the detector and AGC transistor 39. At the same time, the resistor 97, which would normally be connected with the conductive member 140, would be inserted in circuit between the base and ground of the transistor 39. This, as was explained more fully in connection with Figures 1 and 2, increases the forward bias on the detector and AGC transistor 39, thus increasing its gain for phonograph operation. Insertion of the plug 110 into the jack 115 also grounds one side of the phonograph circuit through the grounded terminal 146, the eyelet 147, the nipple 116, and the cap 114 of the plug 110.

Accordingly, for phonograph operation, signals are coupled to the base 40 of the detector and AGC transistor 39. Simultaneously, the forward base-emitter bias on the transistor 39 is increased. Thus the transistor 39 provides high gain preamplifier operation when the phonograph is used. At the same time, the emitter current of the transistor 39 due to the increased forward bias is used to reduce the gain of the R.F. transistor 11 and first I.F. transistor 23, thus preventing the amplification of the radio frequency signals during phonograph operation.

By provision of this invention, phonograph or the like signals may be amplified and reproduced in a radio receiver without the need of on-off switches or critical tuning. This type operation is achieved, moreover, with relatively simple circuitry and a phonograph-radio connector of relatively simple construction.

What is claimed is:

1. In a receiver, the combination with an input stage, an intermediate frequency amplifying stage coupled with said input stage, a combined detector and automatic gain control stage including a transistor having emitter, base, and collector electrodes, means coupling said emitter and collector electrodes with said intermediate frequency amplifying stage, means for biasing said emitter and collector electrodes to detect intermediate frequency signal energy applied thereto from said intermediate frequency amplifying stage, an output stage coupled with said combined detector and automatic gain control stage, and means connecting said combined detector and automatic gain control stage with at least one of said input and intermediate frequency amplifying stages for controlling the gain thereof inversely with changes in strength of a received signal, of connector means for adapting said receiver for the amplification of signals from a signal transducer comprising: means providing signal coupling of signals from said transducer to said combined detector and automatic gain control stage for amplification thereby, and means for changing the bias of said transistor automatic gain control stage to provide relatively high gain amplification of signals from said transducer and for developing a gain control signal for application to at least one of said input and intermediate frequency amplifying stages to reduce the gain thereof and prevent the amplification of received signals.

2. In a receiver, the combination with an input stage adapted to receive a radio frequency signal and to provide an intermediate frequency signal, an intermediate frequency amplifying stage coupled with said input stage, a transistor detector and automatic gain control stage including a transistor having base, emitter and collector electrodes coupled to receive intermediate frequency signals between said base and emitter electrodes from said intermediate frequency amplifying stage for producing an audio frequency and a gain control signal, an output stage coupled with said automatic gain control stage for amplifying said audio frequency signal, and means connecting said transistor detector and automatic gain control stage with said input and intermediate frequency amplifying stages for applying said gain control signal thereto to control the gain thereof inversely with changes in strength of a received radio frequency signal, of connector means for adapting said receiver for the amplification of signals from a phonograph signal pickup comprising: means providing signal coupling of signals from said pickup to said transistor detector and automatic gain control stage for amplification thereby, means for increasing the forward bias of said transistor detector and automatic gain control stage to provide relatively high gain preamplification of signals from said pickup and for developing a gain control signal, and means for applying said last named gain control signal to said input and intermediate frequency amplifying stages to reduce the gain thereof and prevent the amplification of received radio frequency signals.

3. In a receiver, the combination comprising a transistor radio frequency amplifier including base, emitter and collector electrodes, means for applying a received radio frequency signal to said base electrode, means for deriving an amplified radio frequency signal from said collector electrode, means coupled with said collector electrode for converting said radio frequency signal to an intermediate frequency signal, a transistor intermediate frequency amplifier including base, emitter and collector electrodes, means coupling said last named means with the base electrode of said transistor intermediate frequency amplifier, means for deriving an amplified intermediate frequency signal from the collector of said transistor intermediate frequency amplifier, a detector and automatic gain control transistor including base, emitter and collector electrodes, means coupling the collector of said transistor intermediate frequency amplifier with the base of said detector and automatic gain control transistor for applying said amplified intermediate frequency signal thereto, a driver stage coupled with the collector of said detector and automatic gain control transistor, an output stage coupled with said driver stage, means for deriving an automatic gain control signal from the emitter of detector and automatic gain control transistor, means connecting the emitter of said detector and automatic gain control transistor with the emitter electrodes of said transistor radio frequency and intermediate frequency amplifiers for controlling the gain thereof inversely with changes in strength of a received signal, a jack connected in said receiver to adapt said receiver for the amplification of signals from a phonograph signal pickup upon insertion of a phonograph plug in said jack, said jack including circuit connections to provide signal coupling of signals from said phonograph pickup to the base electrode of said detector and automatic gain control transistor for amplification thereby, and means including connections with said jack for increasing the forward base-emitter bias of said detector and automatic gain control transistor to provide relatively high gain amplification of signals from said phonograph signal pickup and for developing a gain control signal on the emitter thereof for application to the emitter electrodes of said transistor radio frequency and intermediate frequency amplifiers to reduce the gain thereof and prevent the amplification of a received radio frequency signal.

4. In a receiver, the combination with a transistor radio frequency amplifier, a transistor intermediate frequency amplifier coupled with said transistor radio frequency amplifier, a detector and automatic gain control transistor including base, emitter and collector electrodes, means coupling said base and emitter electrodes with said transistor intermediate frequency amplifier for developing an audio frequency signal and a gain control signal in response to high frequency signals applied between the base and emitter electrodes thereof, a driver stage coupled with said detector and automatic gain control transistor for amplifying said audio frequency signal, an output stage coupled with said driver stage, and means connecting said transistor detector and automatic gain control stage with said transistor radio frequency and intermediate frequency amplifiers for controlling the gain thereof inversely with changes in strength of a received signal, of connector means including a phonograph plug and a phonograph jack for adapting said receiver for the amplification of signals from a phonograph signal pickup upon insertion of said plug into said jack comprising: means providing signal coupling of signals from said pickup to said transistor detector and automatic gain control stage for amplification thereby, and means for increasing the forward bias of said transistor detector and automatic gain control stage to provide relatively high gain preamplification of signals from said phonograph signal pickup and for developing a gain control signal for application to said transistor radio frequency and intermediate frequency amplifiers to reduce the gain thereof and prevent the amplification of received radio frequency signals.

5. In a radio signal receiving system including a second detector and automatic gain control transistor including base, emitter, and collector electrodes and adapted to provide an automatic gain control signal for controlling the gain of said receiver inversely with changes in amplitude of a received radio frequency signal, a driver stage coupled with the collector electrode of said transistor, and an output stage coupled with said driver stage, the combination comprising, radio-phonograph connector means adapted to provide a direct-current conductive return path for the base and emitter electrodes of said transistor during radio receiver operation and to interrupt said path during phonograph operation, means for applying a signal through said connector from a phonograph pickup device to the base of said transistor, means including said connector and a base bias resistor for increasing the forward base-emitter bias on said transistor to increase the gain thereof for amplification of signals from said phonograph pickup device and for developing a gain control signal on said emitter electrode, and means for applying said last named gain control signal in said receiver to reduce the gain thereof and to prevent the amplification and reproduction of radio frequency signals upon application of signals from said pick-up device to said transistor.

6. In a signal receiver of the type including a high frequency amplifier for translating high frequency signal modulated waves; a combined detector-amplifier stage including a transistor having emitter, base and collector electrodes; circuit means for applying signal modulated high frequency waves from said amplifier directly between said base and emitter electrodes for rectification and detection of the modulating signal of said waves; output circuit means for said combined detector-amplifier stage connected between said collector and emitter electrodes and including an impedance element connected between said emitter and a point of reference potential for said receiver for deriving a control voltage which varies in amplitude as a function of the average level of said high frequency waves; and means for applying said control voltage to said high frequency amplifier for controlling the gain thereof inversely with changes in strength of a received signal; the combination of means for adapting said receiver for the amplification of audio frequency signals from an audio frequency signal source including a connector for selectively applying said audio frequency signals between said base and emitter electrodes for amplification by said stage, means providing a resistor adapted to be connected between said base electrode and ground when audio signals are applied from said source to increase the forward bias between said base and emitter electrodes so that said transistor provides relatively high gain amplification for said audio frequency signals and causes a gain control voltage to be developed across said impedance element of a magnitude to reduce the gain of said high frequency amplifier to prevent the effective amplification of high frequency signal modulated waves applied thereto.

7. In a signal receiver of the type including a high frequency amplifier for translating signal modulated high frequency waves; a combined detector-amplifier stage including a transistor having emitter, base and collector electrodes; circuit means for applying signal modulated high frequency waves from said amplifier directly between said base and emitter electrodes for rectification of said waves; output circuit means for said combined detector-amplifier stage connected between said collector and emitter electrodes; the combination of means for adapting said receiver to amplify audio frequency signals from an audio frequency signal source, including a connector for selectively applying said audio frequency signals between said base and emitter electrodes for amplification by said stage, and means for increasing the forward bias between said emitter and base electrodes when audio signals are applied from said source so that said transistor serves to provide relatively high gain amplification for said audio frequency signals.

UNITED STATES PATENTS

References Cited in the file of this patent

| | | |
|---|---|---|
| 2,077,566 | Holst | Apr. 20, 1937 |
| 2,664,469 | Moehring | Dec. 29, 1953 |